(12) United States Patent
Goettker

(10) Patent No.: US 7,270,345 B2
(45) Date of Patent: Sep. 18, 2007

(54) SWIVEL JACK ASSEMBLY

(76) Inventor: Bernhardt Goettker, 14195 Ridge Canyon Rd., Valley Center, CA (US) 92082

( * ) Notice: Subject to any disclaimer, the term of this patent is extended or adjusted under 35 U.S.C. 154(b) by 0 days.

(21) Appl. No.: 11/243,936

(22) Filed: Oct. 5, 2005

(65) Prior Publication Data

US 2007/0075538 A1    Apr. 5, 2007

(51) Int. Cl.
*B60S 11/00* (2006.01)

(52) U.S. Cl. .................. 280/763.1; 254/418; 403/162; 403/164

(58) Field of Classification Search ............. 280/763.1, 280/764.1, 765.1, 766.1; 254/418; 403/161, 403/162, 164
See application file for complete search history.

(56) References Cited

U.S. PATENT DOCUMENTS

| | | | | |
|---|---|---|---|---|
| 2,945,713 A | * | 7/1960 | Sears | 403/73 |
| 3,020,063 A | * | 2/1962 | Warren, Jr. | 280/763.1 |
| 4,070,041 A | * | 1/1978 | Brammer | 280/763.1 |
| 4,076,346 A | * | 2/1978 | McMahan, Sr. | 384/297 |
| 4,283,154 A | * | 8/1981 | Shepherd | 403/78 |
| 4,589,632 A | * | 5/1986 | Smith | 254/418 |
| 5,067,692 A | * | 11/1991 | Nudd et al. | 254/420 |
| 6,302,381 B1 | * | 10/2001 | Roll | 254/425 |

* cited by examiner

*Primary Examiner*—Christopher P. Ellis
*Assistant Examiner*—John D Walters
(74) *Attorney, Agent, or Firm*—Rudolf O. Siegesmund; Gordon & Rees, LLP

(57) ABSTRACT

The assembly incorporates two plates. There are annular protrusions on one plate and a matching annular groove on the other. A central bolt and washer holds the plates in engagement while permitting rotation of one plate relative to the other. The cooperating annular grooves and protrusions transfer loads between plates. Ninety degrees of rotation causes the jack assembly to rotate from the vertical stowed position to the horizontal towed position.

6 Claims, 5 Drawing Sheets

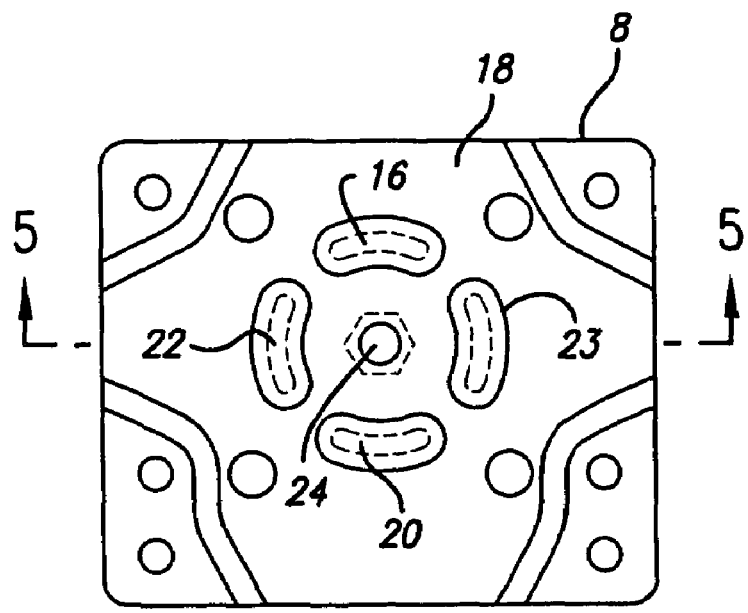
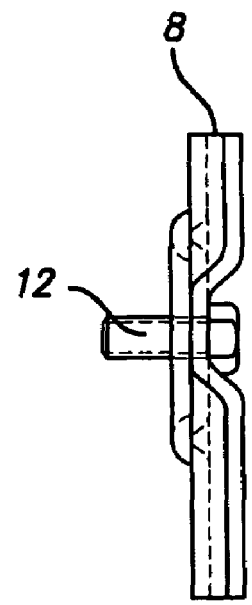
FIG. 3  FIG. 4
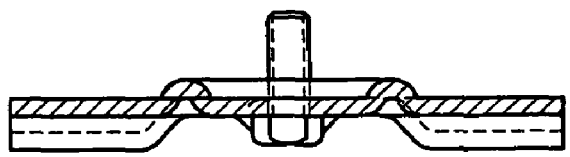
FIG. 5

SWIVEL JACK ASSEMBLY

FIELD OF THE INVENTION

The present invention relates generally to the field of swivel jacks for towed vehicles such as trailers.

BACKGROUND OF THE INVENTION

Swivel jacks are used with trailers to vertically position the trailer tongue so that it can be mounted onto a hitch of a towing vehicle. The swivel jacks keep the trailer level when the trailer is disengaged from the towing vehicle. Typically these jacks are pivotably mounted onto the trailer tongue such that they can be pivotally moved to a horizontally stored position when not in use. The jack tube swings from its horizontal transit position to the vertical stationery position, locking securely into place with a spring-loaded pin.

Current swivel jacks are comprised of two brackets connected together with a bolt. The design of the brackets causes the center bolt to take the entire load, which could result in the bolt being sheared off or worn down. What is needed is an improved swivel jack that disperses the load from the bolt to other areas of the jack assembly.

SUMMARY OF THE INVENTION

The present invention provides a swivel jack assembly for dispersing load from a bolt to other areas of the swivel jack assembly. The swivel jack assembly is comprised of a mounting bracket welded or bolted to an elongated tubular housing of a jack. Attached to the mounting bracket is a first rotatable plate having an annular circular groove. The annular groove accepts the annular protrusions of a second rotatable plate allowing the first rotatable plate to rotate within the second rotatable plate. A bolt and washer secure the first rotatable plate to the second rotatable plate and a releasable latch secures the jack in either an upright position or a towed position. The annular grooves disperse the load from the bolt to other areas of the jack assembly so that the bolt will not be sheared off or be worn down.

The foregoing, together with other features and advantages of the present invention, will become more apparent when referring to the following specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 3 illustrates a front view of the second rotatable plate;

FIG. 4 is a side view of the second rotatable plate illustrated in FIG. 3;

FIG. 5 is a cross-sectional view of the second rotatable plate illustrated in FIG. 3;

DETAILED DESCRIPTION OF THE DRAWINGS

Figure 1:
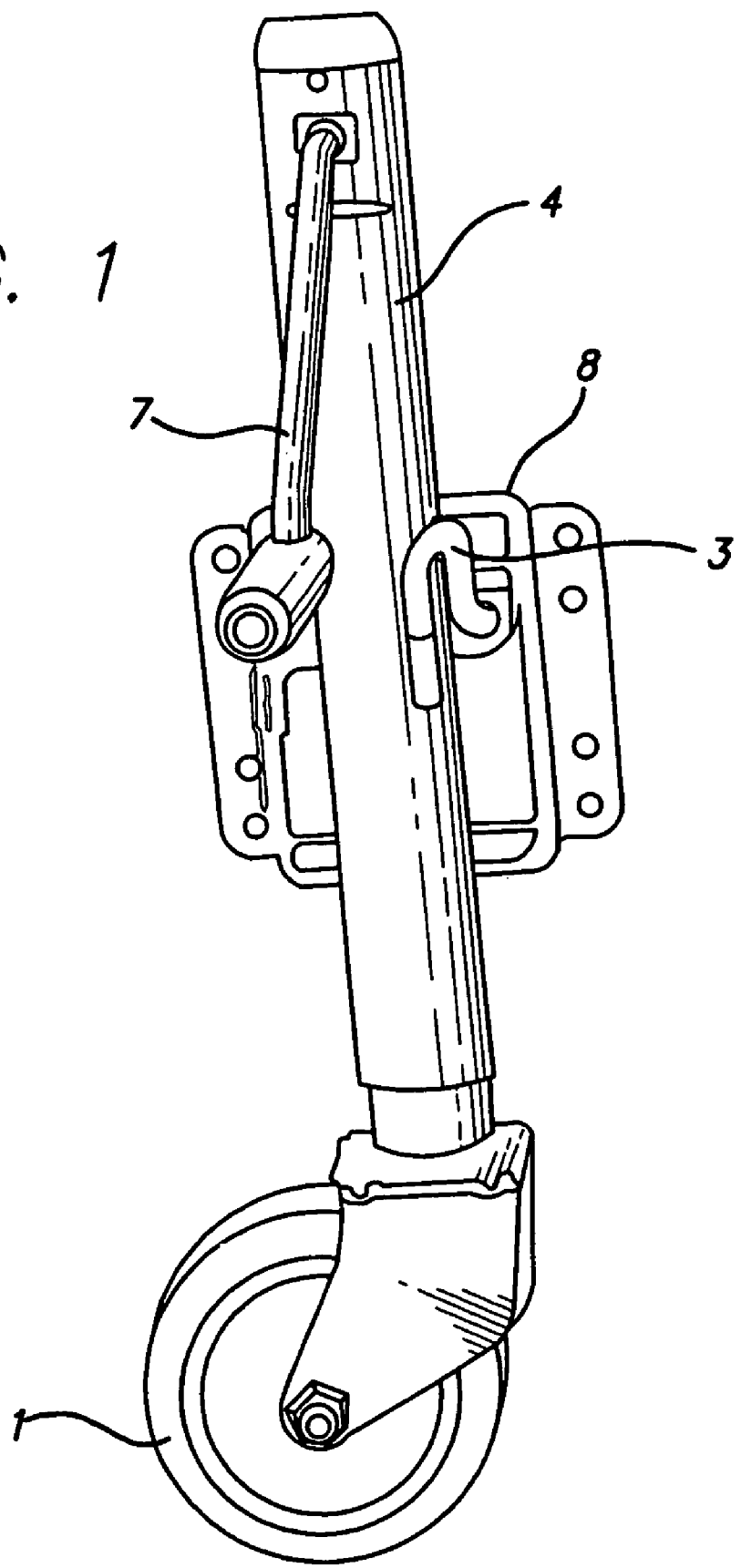
FIG. 1 illustrates the swivel jack assembly of the present invention.

FIG. 1 illustrates the swivel jack assembly of the present invention which is mounted onto the side of a trailer tongue (not shown). The jack includes an elongated tubular housing 4, which telescopically receives a tube for raising and lowering the trailer tongue, and a wheel 1 on the lower end of the tubular housing so the trailer can be easily moved when detached from a towing vehicle. The tube is raised and lowered out of the elongated tubular housing by turning a handle 7 located on the jack. A mounting bracket secures the elongated tubular housing to a first rotatable plate, which is attached to a second rotatable plate by a bolt or screw. The mounting bracket is welded or bolted to the trailer tongue attaching the jack assembly to the trailer tongue. A releasable latch 3 is provided on the jack in order to hold the jack in either a horizontal towed position or a vertical stowed position. The jack is utilized to lower and raise the trailer tongue to facilitate engagement of the trailer to and disengagement of the trailer from a towing vehicle. When the trailer is disengaged from the jack, the jack supports the tongue from the ground and helps keep the trailer in a level position. When the jack in is the towed position, the jack is parallel to the trailer tongue.

Figure 2:
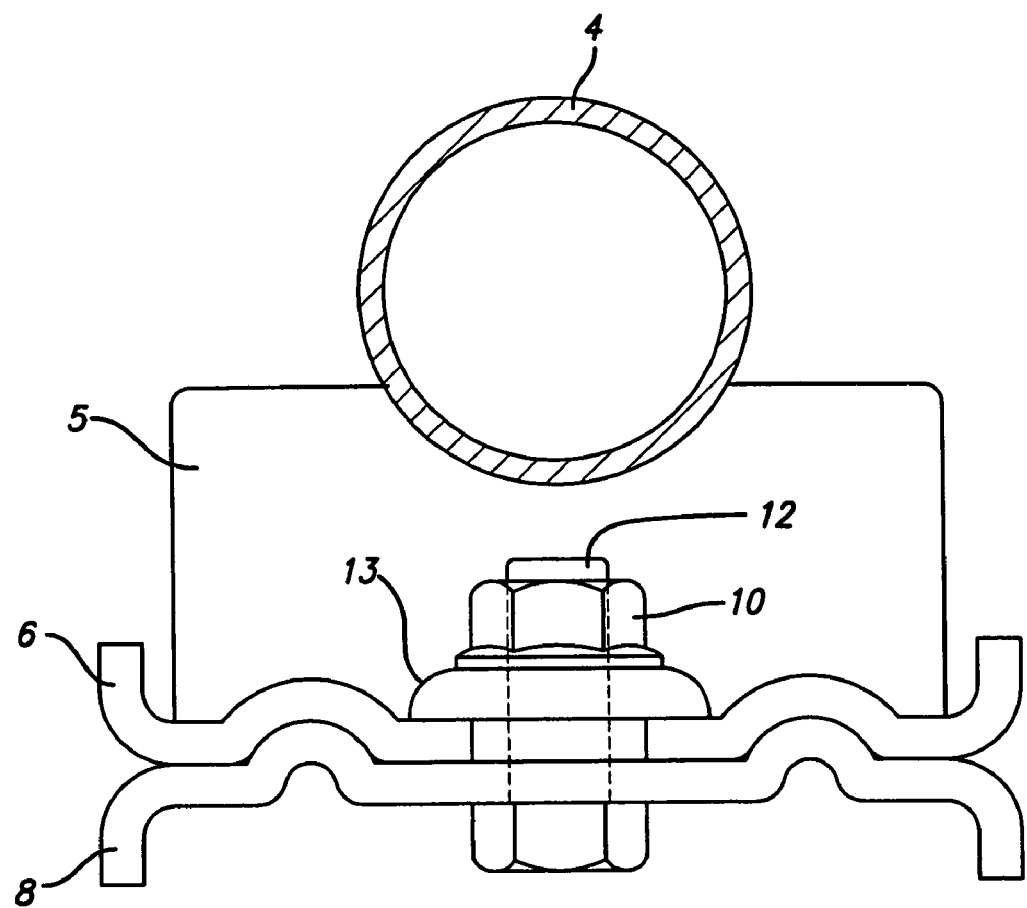
FIG. 2 illustrates a top view of the swivel jack assembly of the present invention.

Turning to FIG. 2, a top view of the swivel jack assembly of the present invention is illustrated. The elongated tubular 4 housing is attached to a mounting bracket 5, which is attached to a first rotatable plate 6 and a second rotatable plate 8 with a nut 10 and bolt 12 and washer 13. The washer 13 disperses the bolt load over the larger surface of the first rotable plate 6 so that the bolt 12 will not be sheared off or worn down. Annular protrusions on the surface of the second rotatable plate and a circular annular groove on the back surface of the first rotatable plate 6 allow the first rotatable plate 6 to easily rotate independent of the second rotatable plate 8 so the jack can be in an engaged upright position or a disengaged towed position for traveling. By pulling on the releasable latch 3, the jack is allowed to move from the upright position to the towed position and vice versa.

FIG. 3 illustrates front view of the second rotatable plate 8. The second rotatable plate 8 includes four annular protrusions (16, 20, 22, 23) protruding from the top surface of the plate and a hole 24 for insertion of the bolt 12 to secure the plate 8 to the first rotatable plate 55. The four annular protrusions (16, 20, 22, 23) are provided so that the jack can be easily rotated. Although in the preferred embodiment of the present invention, four annular protrusions are shown on the top surface of the second rotatable plate 8, the second rotatable plate 8 may be comprised of a greater number or a lesser number of annular protrusions, however there must be at least one annular protrusion. FIG. 4 is a side view of the second rotatable plate 8 illustrated in FIG. 3 and FIG. 5 is a cross-sectional view of the second rotatable plate 8 illustrated in FIG. 3.

Figure 6:
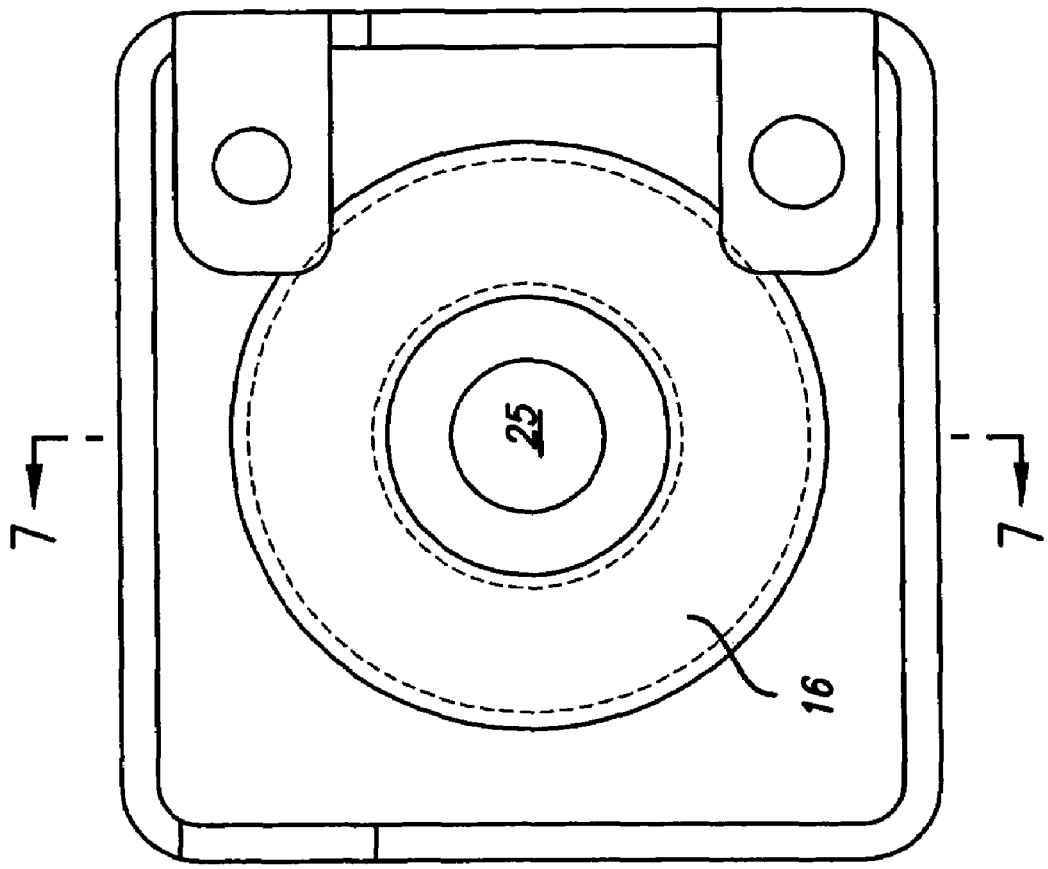
FIG. 6 illustrates a front view of a first rotatable plate.

FIG. 6 illustrates a front view of the first rotatable plate 6. The first rotatable plate includes a circular groove 16 for accepting annular protrusions allowing the first rotatable 6 plate to rotate which in turn allows the jack to rotate between the engaged and disengaged positions. Also included on the first rotatable plate 6 is a pair of flanges for securing the first rotatable plate 6 to the mounting bracket and a hole 25 for insertion of the bolt to secure the plate to the second rotatable plate 8.

Figure 7:
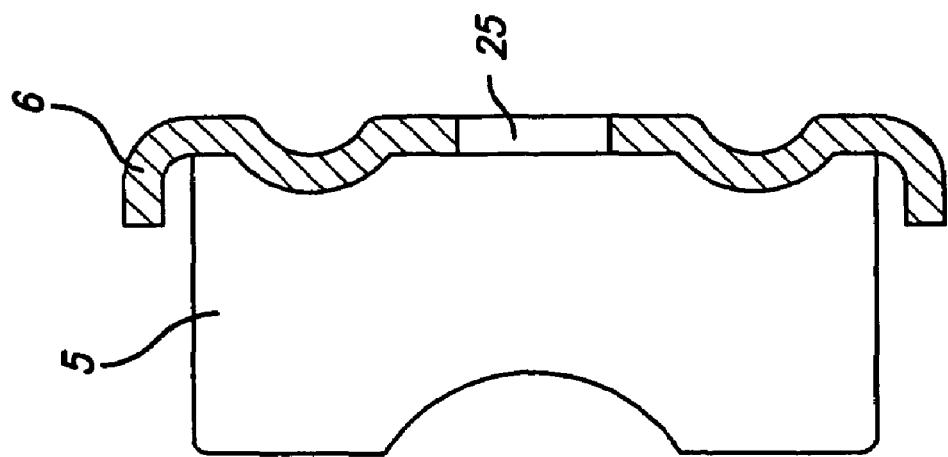
FIG. 7 illustrates a cross-sectional view of the first rotatable plate illustrated in FIG. 6.

FIG. 7 is a cross-sectional view of the first rotatable plate 6 illustrated in FIG. 6 attached to the mounting bracket 5, which is attached to the tubular housing 4 of the jack. Also shown in FIG. 7 is a hole 25 which receives bolt 12. The jack assembly of the present invention also comprises a locking mechanism to prevent unwanted movement of the jack. The locking mechanism is comprised of the releasable latch and the first and second rotatable plates shown in FIG. 1. Upon pulling on the releasable latch, the jack is released and can be rotated into either an upright position or a towed position. The annular protrusions of the second rotatable plate 8 are disposed in the annular groove of the first rotatable plate 6, which enables pivotal rotation of the first rotatable plate 6. When the first rotatable plate 6 is in the correct position, that is either in the engaged upright position or a disengaged towed position for traveling, the releasable latch is released causing a pin to be inserted into the jack assembly locking the jack in position.

Figure 8:
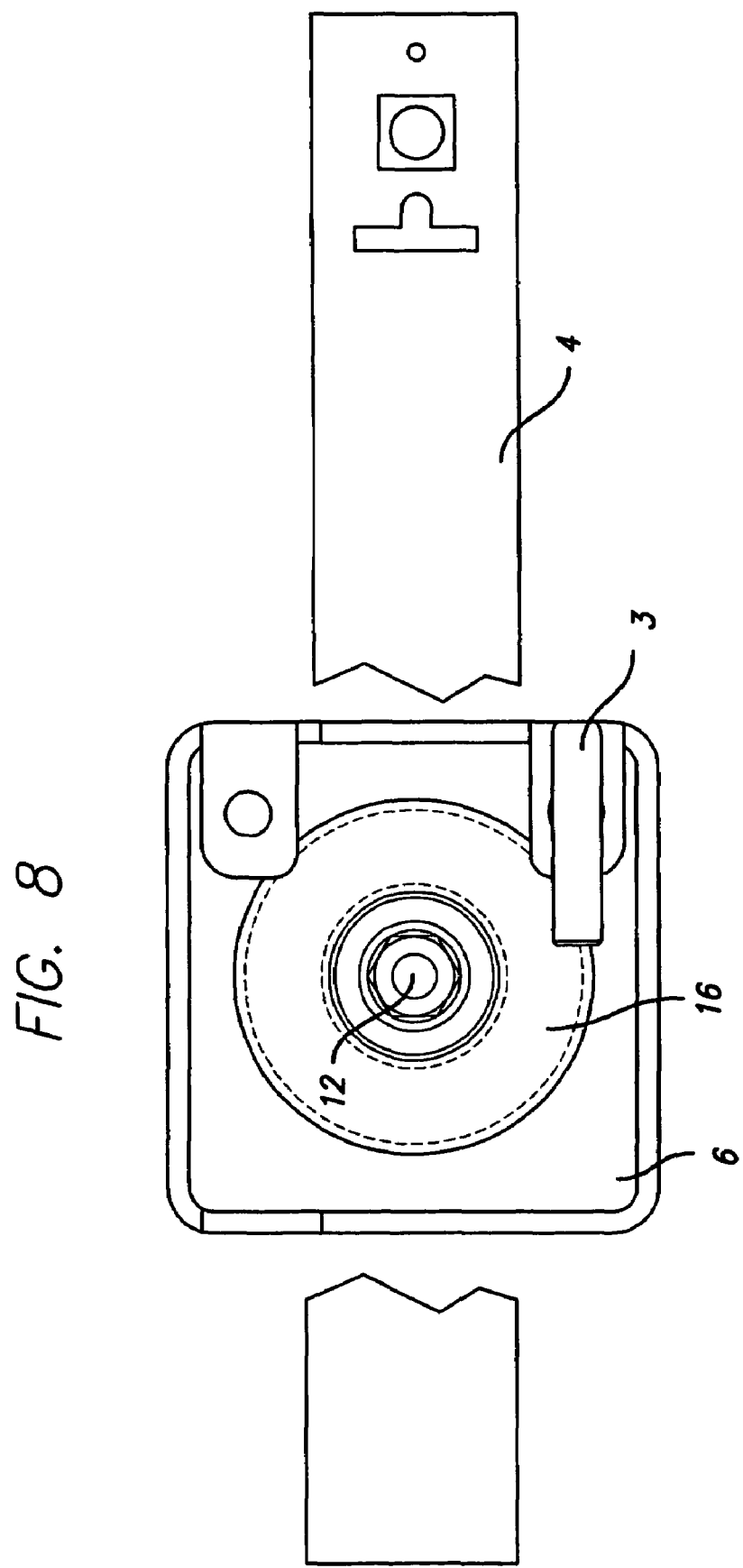
FIG. 8 illustrates a front view of the jack assembly of the present invention.

FIG. 8 illustrates a front view of the jack assembly of the present invention. The elongated tubular housing 4 is attached to the first rotatable plate 6 comprising the annular groove so the second rotatable plate (not shown) can rotate. Also shown in FIG. 8 is the releasable latch 3 to hold the jack in the proper position.

Although an exemplary embodiment of the invention has been described above by way of example only, it will be understood by those skilled in the field that modifications may be made to the disclosed embodiment without departing from the scope of the invention, which is defined by the appended claims.

I claim:

1. A swivel jack assembly for dispersing a load, the swivel jack assembly comprising:
   a mounting bracket affixed to an elongated tubular housing of a jack;
   a first plate secured to the mounting bracket, the first plate having a first inner portion and a first outer portion in the same vertical plane, and having a first aperture in the center of the first inner portion and a shallow groove forming a narrow circular ring centered around the first aperture, separating the first inner portion and the first outer portion, wherein the shallow groove is no deeper than the thickness of the first plate;
   a second plate secured to a trailer tongue, the second plate having a second inner portion and a second outer portion in the same vertical plane, and having a second aperture in the center of the second inner portion and a plurality of protrusions forming a discontinuous narrow circular ring centered around the second aperture, separating the second inner portion and the second outer portion, wherein the height of the protrusions are adapted to matingly engage the shallow groove of the first plate while the first inner portion of the first plate is in planar contact with the second inner portion of the second plate and the first outer portion of the first plate is in planar contact with the second outer portion of the second plate;
   a bolt passing horizontally through the first aperture in the first plate and the second aperture in the second plate, securing the first plate to the second plate, and adapted so that when the shallow groove of the first plate accepts the plurality of protrusions of the second plate and a load is applied to the swivel jack, the shallow groove bears a load at an upper arc of contact between the shallow groove and the plurality of protrusions above the bolt, and the shallow groove bearing a load at a lower arc of contact between the shallow groove and the plurality of protrusions below the bolt; and
   a releasable latch for securing the jack in either an upright position or a towed position, the releasable latch comprising a pin securing the first plate to the second plate, wherein the load is distributed between the upper arc of contact and the lower arc of contact.

2. The swivel jack assembly of claim 1, further comprising a tube, the tubular housing telescopically receiving the tube for raising and lowering the trailer tongue.

3. The swivel jack assembly of claim 2, further comprising a wheel on the lower end of the tubular housing for easily moving a trailer attached to the jack assembly.

4. The swivel jack assembly of claim 1, wherein the jack is released and can be rotated into either an upright position or a towed position when releasing the releasable latch.

5. The swivel jack assembly of claim 1, wherein the first plate rotates around the bolt with respect to the second plate so the jack can be in an engaged upright position for supporting the trailer tongue or a disengaged towed position for traveling.

6. The swivel jack assembly of claim 1, further comprising a tube inside the elongated tubular housing which is raised and lowered by turning a handle located on the jack.

* * * * *